J. E. Emerson,
Saw Teeth.

Nº 56,142.   Patented July 3, 1866.

Witnesses.   Inventor.

UNITED STATES PATENT OFFICE.

J. E. EMERSON, OF TRENTON, NEW JERSEY, ASSIGNOR TO THE AMERICAN SAW COMPANY.

IMPROVEMENT IN SAWS.

Specification forming part of Letters Patent No. 56,142, dated July 3, 1866.

*To all whom it may concern:*

Be it known that I, J. E. EMERSON, of Trenton, in the county of Mercer and State of New Jersey, have invented a new and Improved Manner of Attaching Saw-Teeth to Saws; and I do hereby declare that the following is a full, clear, and exact description thereof, which will enable others skilled in the art to understand the same, reference being had to the accompanying drawings, forming part of this specification, in which—

Figure 1:
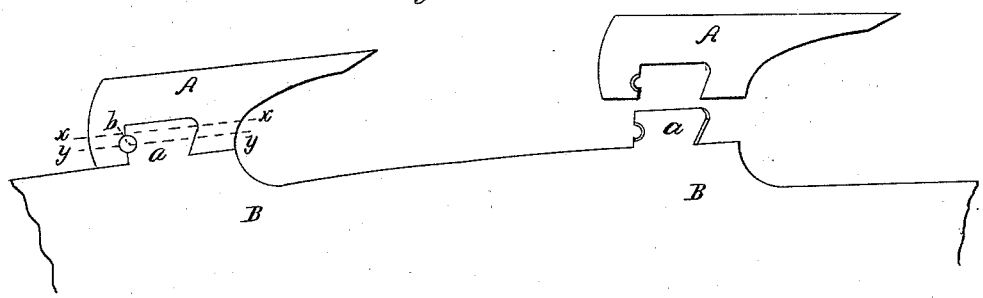
Figure 2:
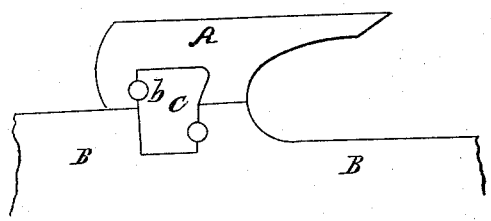
Figure 3:
Figure 4:
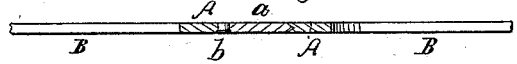

Figure 1 is a side view of a part of a saw-plate with the teeth attached according to my invention, one of the teeth being shown detached. Fig. 2 is a side view of a part of a saw-plate, the manner in which the teeth are attached being a modification of my invention. Fig. 3 is a detail sectional view taken through the line $x\ x$, Fig. 1. Fig. 4 is a detail sectional view taken through the line $y\ y$, Fig. 1.

My invention has for its object the attaching the teeth to a saw-plate in such a manner that they may be easily removed for renewal, that the insertion of a new set of teeth will not strain the saw-plate, and that they are inserted in such a manner that it is impossible for them to fly out under the heavy strain to which they are subjected when the saw is at work.

By the common method of attaching removable teeth notches were cut into the saw-plate, into which the teeth fitted, which were then secured to the saw-plate by rivets passing through a hole, half of which was cut into the tooth and the other half into the adjoining portion of the plate. In this manner great strain or spring was brought to bear upon the plate, as it was impossible to avoid slight differences in the size of the teeth or rivets which took the place of those worn out, and as also the heading of the rivets has the tendency to bring additional strain upon the saw-plate, frequent hammering and straightening of the plate becomes necessary, causing great expense and delay.

My invention completely overcomes this difficulty and improves the security and firm attachment of the teeth to the plate.

Instead of cutting notches into the plate into which the teeth fit, I make an incision into each tooth A, a corresponding projection, $a$, on the plate B, fitting into incision in the tooth, as shown in Fig. 1. A rivet, $b$, is then driven through, half of it passing through the projection $a$ and the other half through the tooth A, as shown in Figs. 1 and 4.

That side of the projection $a$ which is opposite to the one through which the rivet $b$ passes has a V-shaped edge, Figs. 3 and 4, fitting into a corresponding groove in the tooth. The tooth is attached by placing the grooved edge of the tooth on the V edge of the projection, driving the end which has half the rivet-hole in it into the saw-plate from the side, which can very easily be done by a slight blow or pressure, then put in the rivet and head up to fill the countersink shown in Fig. 4, and cut or file it off smooth with the plate, when the teeth will be held almost or quite as firmly on the saw as if the teeth were solid with the plate.

In this manner it is evident that, as the rivet is not within the periphery of the main portion of the plate B, no strain will be brought to bear upon the plate itself, but only upon the tooth and projection $a$, thereby securing the tooth firmly to the saw and bringing the whole strain lengthwise of the tooth, which has the tendency of stiffening instead of weakening the tooth.

By my improved method teeth may be firmly attached to saws and detached without changing in the least the position of or straining the saw-plate.

Fig. 2 shows a modification of the manner of attaching the tooth.

A recess is cut into the saw-plate B, into which the small plate C is firmly secured, the end of which plate projects from the saw-plate like the projection $a$, Fig. 1.

The outer end of the plate C fits into the tooth A, being attached to the tooth in the same manner as the projection $a$, Fig. 1, and as heretofore described. This plate C, not being worn out at all, will always remain in the saw-plate, the teeth only being renewed.

The same end is therefore attained by this method, as well as by the one first mentioned—viz., to take away the strain from the saw-plate and transfer it to the teeth.

I do not confine myself to the manner here shown of securing the teeth to the projections *a* or C, nor do I confine myself to any number of such projections or notches in each tooth, or any shape of such projections or notches.

Having thus described my invention, what I claim as new, and desire to secure by Letters Patent, is—

Constructing the teeth of a saw with recesses in such a manner that they may be attached to projections from the saw-plate, substantially in the manner herein shown and described.

J. E. EMERSON.

Witnesses:
   M. M. LIVINGSTON,
   ALEX. F. ROBERTS.